July 3, 1934.  J. M. BOYKOW  1,964,869
STABILIZING APPARATUS
Filed Jan. 7, 1932
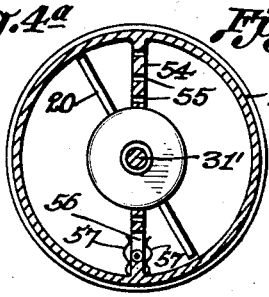
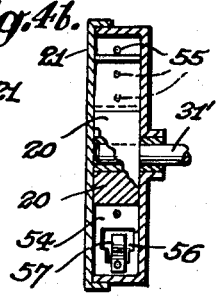
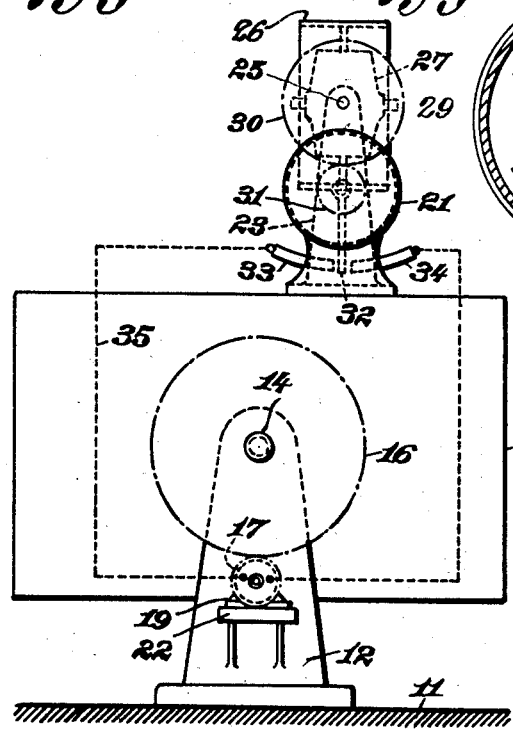
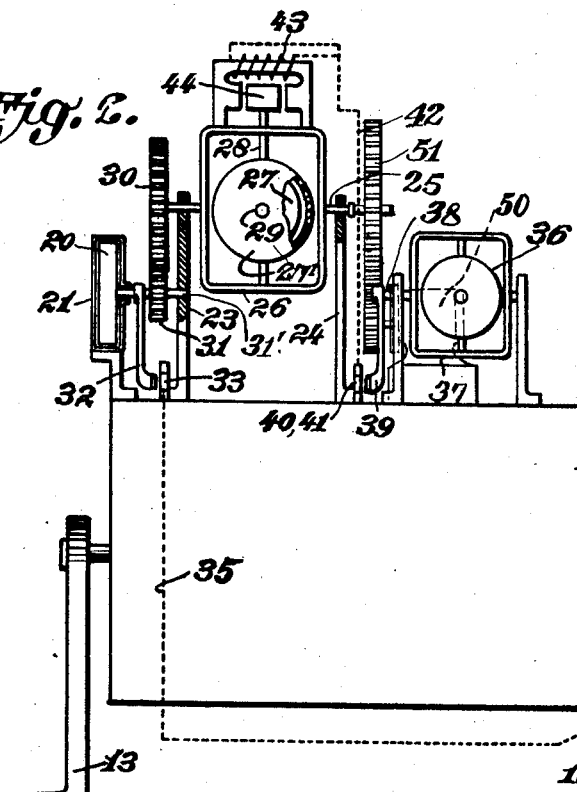
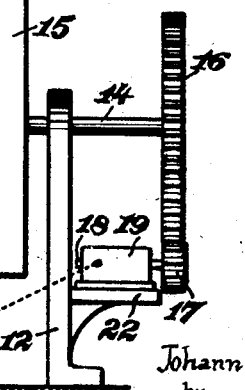
Inventor:
Johann Maria Boykow
by Lotka & Kehlenbeck
Attorneys.

Patented July 3, 1934

1,964,869

UNITED STATES PATENT OFFICE 1,964,869

STABILIZING APPARATUS

Johann Maria Boykow, Berlin-Lichterfelde-West, Germany

Application January 7, 1932, Serial No. 585,200
In Germany January 8, 1931

11 Claims. (Cl. 74—5)

My invention relates to stabilizing apparatus for air-craft, ships, or machinery and appliances mounted on them, by the aid of gyroscopes.

For stabilizing such bodies it is already known to use deflection indicators, such as gyroscopes, which detect and measure the deflections of the body to be stabilized from its position of stability or equilibrium, and control intermediate members which in their turn bring into play electric, hydraulic or other motors adapted to adjust the ailerons of airplanes for instance, or to produce turning moments against abutments located outside of the body to be stabilized or balanced.

It has also been proposed to stabilize heavy bodies by motor-driven gyroscopes of which that bearing axle is rigidly connected with the body to be stabilized which is located parallel to the axis around which the body is to be stabilized. As far as damping devices exist in these known gyroscopes they are springy so that they produce an elastic moment. Such arrangements have, however, the disadvantage that the elastic moment partly neutralizes the damping action of the gyroscope.

The object of my invention is to eliminate these drawbacks, and to increase the steadiness of the gyroscope combined with as high a damping action as possible.

According to my invention the working gyroscope mounted on the body to be stabilized is connected to the body to be stabilized by means of a yielding but inelastic coupling. The damping device engages the frame of the gyroscope and not the precession axle so that the gyroscope itself is free to precess within the frame. This latter fact has more particularly the advantage that in the case of sudden shocks in the motion of the body to be stabilized these shocks cannot be transmitted to the gyroscope to their full extent, so that the nutation oscillations of the gyroscope caused hitherto by such shocks are prevented. The inelastic damping device effecting the coupling between the frame of the gyroscope and the body to be stabilized is so designed that its damping moment grows with the angular velocity of the oscillation of the body to be stabilized and always remains smaller than the precession moment of the gyroscope caused by this angular velocity. The damping intensity of the coupling device should preferably also be adapted to the inertia of the body.

In order to bring about an accurate return of the body to be stabilized or balanced into its position of equilibrium, a repositioning motor is according to a further feature of my invention connected with the body and is controlled in dependence on apparatus measuring the deflections of the body to be stabilized from its position of stability or equilibrium. The control of this motor may, for instance, be effected by a further control gyroscope mounted on the body to be stabilized or also directly in correspondence with the displacement of the frame of the working gyroscope. The turning movements imparted to this frame through the damping device when the body is deflected from its position of equilibrium, are likewise an approximate measure for the magnitude of the deflection. If such a repositioning motor is provided for the body to be stabilized, which on airplanes or ships might also be designed as an adjusting motor for the ailerons or steering planes, the working gyroscope has mainly the object to prevent the angular deflection between the gyroscope and the body from increasing rapidly. The damping device interposed between the gyroscope and the body should be such that it leaves sufficient time to the repositioning motor to overcome the inertia of its armature so that the latter is able to follow the angular deflection of the body. All means contributing to this end promote the solution of the damping problem upon which my invention is based. According to a further feature of my invention an additional control gyroscope may thus be mounted on the body to be stabilized, which additional gyroscope acts directly through a motor controlled by it on the precession axle of the working gyroscope. Such a control gyroscope then reduces the precession of the working gyroscope and in this way increases the damping moment produced by it. According to another feature of my invention a further motor may be coupled with the axle of the frame in which the working gyroscope is suspended, which motor is adapted to be regulated by a control gear adjustable from the precession axle of the working gyroscope and which transmits to the axle of the frame of working gyroscope a moment in such a direction that excessive precession movements of the working gyroscope are prevented by this motor. The moment exerted by this motor on the frame is thus oppositely directed to that which is transmitted to this frame by the body to be stabilized through the damping device.

My invention will be better understood with reference to the accompanying drawings illustrating one embodiment, by way of example, and in which Fig. 1 is a side-elevation,
Fig. 2 a front-elevation, and Fig. 3 a plan of the body to be stabilized and the stabilizing apparatus mounted thereon, while Figs. 4a and 4b are sections in planes at right angles to each other, showing the hydraulic brake interposed between the body to be stabilized and the frame of the working gyroscope.

Referring to the drawings 11 is an oscillating base or platform, for instance the deck of a ship, upon which are mounted the pedestal bearings 12 and 13 supporting the axle of rotation or shaft 14 of the body 15. On this body there is mounted in further pedestal bearings 23 and 24, the axle 25 of the frame 26 of the working gyroscope 27¹. The precession axle of the gyroscope is indicated by the reference numeral 28 and the rotation axle of the gyroscope by the numeral 29, said rotation axle 29 carrying the customary rotor 27 as shown in Figs. 2 and 3. If the working gyroscope should be intended to stabilize or balance the body 15 around a shaft other than the shaft 14 shown, the bearings of the axles of the gyroscope must be correspondingly changed. On the axle 25 of the frame 26 is mounted the spurwheel 30 which meshes with the pinion 31 mounted in the pedestal bearing 23 and on the axle of which is fixed the contact arm 32, which thus swings in response to the turning of the wheel 30. On the axle 31' of the pinion 31 there is also mounted the propeller wheel 20 of a hydraulic brake the case or housing 21 of which is rigidly secured to the body 15. In detail, this brake may be constructed as shown in Figs. 4a and 4b. The housing 21 has a partition 54 provided with small ports 55 for the passage of the fluid. If the housing 21 is turned, the propeller wheel 20 and the frame 26 of the gyroscope 27 will follow such movement with a certain time lag due to the interposition of the hydraulic brake, the intensity of the damping action produced by said brake being proportional to the velocity with which the body 15 rocks or swings. In order to limit the maximum intensity of such damping action, which should never be greater than the precession moment of the gyroscope 27, there is provided in the partition 54 a flap or valve 56 which will open, in opposition to the action of springs 57, whenever the difference between the pressures on opposite sides of said partition exceeds a predetermined limit. Instead of the hydraulic brake any other inelastic damping device may be employed, for instance an electric eddy current brake.

The contact lever or arm 32 shifted according to the rotation of the gyroscope frame 26 on being deflected to the right or left passes along one of the contact rails or bars 33 or 34 whereby the motor 19 electrically connected to these contact rails, for instance as indicated at 35 is started clockwise or counter-clockwise. The stator of this motor 19 is mounted on the bracket 22 secured to the pedestal bearing 12 and thus to the oscillating platform or deck 11 of the ship. The armature of the motor 19 is by means of the reduction gearing 16, 17 operatively connected to the axle or rocking shaft 14 of the body 15.

On this body 15 is also mounted the control gyroscope 36 the axis of which is parallel to that of the working gyroscope 27. The frame 37 of the control gyroscope 36 is likewise adapted to turn in bearing pedestals mounted on the body 15. The turning spindle 38 of this frame carries the contact arm 39 which when the frame 37 is deflected in relation to the body 15 runs on to one of the two contact rails 40 and 41 fixed on the body 15, said rails being of the same character as the rails 33, 34. To these rails are by the lines 42 electrically connected the windings of an electromagnet 43 mounted on the frame 26 of the working gyroscope. This electromagnet encloses the armature 44 secured to the precession axle 28. The apparatus 43, 44 constitutes a motor or torque generator whose purpose is to increase the steadiness of the working gyroscope. The windings of the electromagnet 43 are thus energized when a relative motion takes place between the control gyroscope 36 and the oscillating body 15, that is when the body 15 is deflected from its position of equilibrium, in such a manner that the turning moment of the armature 44 acts in opposition to the precession moment of the gyroscope 27.

According to Fig. 3 of the drawings the precession axle 28 of the working gyroscope also carries a contact arm 45 which across the contacts 46 and 47 mounted on the frame 26 and connecting lines 48, 49 controls a motor 50 mounted on a bracket secured to the pedestal bracket 24.

When the gyroscope 27 performs a precession movement the switch arm 45 runs on to the contact 46 or 47 and starts the motor 50 clockwise or counter-clockwise in such a manner that through a reduction gear 51 the motor tends to turn the gyroscope frame 26 in the opposite direction to the damping device 20, 21. The object of the motor 50 is thus to prevent excessive precession movements of the gyroscope 27 in the event of too rapid angular motions of the body 15.

The mode of operation of the apparatus described is as follows:

If the body 15 performs an angular motion around its axle 14, it will also turn the frame 26 of the gyroscope 27 to a corresponding extent, through the hydraulic braking device 20, 21 and the spur wheels 30, 31. The gyroscope opposes this turning motion by a precession moment, precessing around the axle 28. The gyroscope thus damps this motion of the body 15. The inelastic braking device 20, 21 damps the angular motion which the frame 26 describes in relation to the body 15. The damping moment of the damping device 20, 21 is then, like the precession moment of the gyroscope 27, proportional to the angular velocity of the turning motion of the body 15. According to my invention the damping moment is so proportioned that it is always smaller than the precession moment of the gyroscope. Simultaneously with the damping motion of the hydraulic brake 20, 21 the contact arm 32 is moved clockwise or counterclockwise so that the motor 19 is started in one direction or the other and turns the body 15 back into its original central position. In the case of regular oscillations of the body 15 around its position of equilibrium, the gyroscope 27 would by itself be able to bring about an efficacious damping of these oscillations. An accurate maintenance of the position of equilibrium by these means alone is, however, impossible. Perfect stabilization is only rendered possible by means of the repositioning motor 19. It is obvious that for achieving this purpose the motor 19 might also be controlled by the control gyroscope 36, in which case the motor would have to be connected to the contact device 39, 40, 41 shown in the drawings.

The damping moment of the damping device 20, 21 should amount to about one third of the precession moment of the working gyroscope 27. If it were smaller the gyroscope 27 might easily be set in nutation oscillations in the event of sudden movements of the body 15. In any case the gyroscope would perform impermissibly large precession movements in the event of considerable angular deflections of the body 15 to be stabilized, if the motor 50 and torque generator 43, 44 were not provided. This is prevented by the motor 50 which as soon as the gyroscope 27 precesses in one or the other direction transmits a supporting moment to the gyroscope frame 26, which acts in opposition to the moment which causes the gyroscope to perform the precession movement. The motor or torque generator 43, 44 prevents, furthermore, an excessively quick precession movement, because it is switched on in a corresponding sense by the control gyroscope deflecting in relation to the oscillating or rocking body 15. Preferably the turning moments or torques which the motor 50 and or torque generator 43, 44 exert on the gyroscope are adapted to the deflections of the contact arms 45 and 39, by these contact arms not switching on the motor directly but adjusting a starting rheostat for these motors.

It will be noted that the working gyroscope 27 has three degrees of freedom relatively to the body 15 to be stabilized, since said gyroscope rotates or spins about the axis 29, the position of which can vary as the housing in which the axis or shaft 29 is journaled, rocks about the precession axle 28, which in turn can alter its position as the gyroscope frame 26 rocks about the trunnion axis 25. The three axes 29, 28, and 25 intersect mutually, as will be clear from Figs. 2 and 3.

The second gyroscope 36 has one degree of freedom of precession, about the axis by which the housing of said gyroscope is journaled in the frame 37.

Various changes in the specific forms shown and described may be made within the scope of the claims without departing from the spirit of my invention.

I claim as my invention:

1. A stabilizing apparatus for rocking bodies, comprising a frame pivotally mounted on the body to be stabilized, a gyroscope pivotally mounted on said frame about a precession axis and rotatable about a rotation axis, a hydraulic damping device forming a coupling between the pivotal axis of said frame and the body to be stabilized, means for limiting the maximum damping moment of said hydraulic damping device, a motor adapted to be operatively connected with the rocking axis of said body, control means for said motor, an operative connection between said control means and said hydraulic damping device, a torque generator operatively connected with the precession axis of said gyroscope, control means for said torque generator, another gyroscope pivotally mounted on said body with two degrees of freedom of precession and with one of the two axes of precession arranged parallel to the pivotal axis of the frame of the first gyroscope, and an operative connection between the control means of said torque generator and said axis of the second gyroscope which is parallel to the pivotal axis of the frame of the first gyroscope.

2. A stabilizing apparatus for rocking bodies, comprising a frame pivotally mounted on the body to be stabilized, a gyroscope pivotally mounted on said frame about a precession axis and rotatable about a rotation axis, a hydraulic damping device forming a coupling between the pivotal axis of said frame and the body to be stabilized, means for limiting the maximum damping moment of said hydraulic damping device, a motor adapted to be operatively connected with the rocking axis of said body, control means for said motor, an operative connection between said control means and said hydraulic damping device, a torque generator operatively connected with the precession axis of said gyroscope, control means for said torque generator, another frame pivotally mounted on the said body, a gyroscope pivotally mounted on said second frame with two degrees of freedom of precession, and an operative connection between said control means of the torque generator and the pivotal axis of said second frame.

3. A stabilizing apparatus for rocking bodies, including a working gyroscope comprising a frame pivotally mounted about an axis parallel with the rocking axis of said body, and a gyroscope casing pivotally mounted in said frame about a precession axis, the impulse axis of said gyroscope being mounted in said casing, the frame axis, the precession axis and the impulse axis being perpendicular to each other, inelastic means whereby the frame axis is yieldingly connected with the body, driving means adapted to create a turning moment in the body about the rocking axis thereof tending to restore said body to equilibrium, and means governed by the deflections of the gyroscope frame for controlling the driving means in dependence upon said deflections relatively to the body.

4. A stabilizing apparatus for rocking bodies, including a working gyroscope comprising a frame pivotally mounted about an axis parallel with the rocking axis of said body, and a gyroscope casing pivotally mounted in said frame about a precession axis, the impulse axis of said gyroscope being mounted in said casing, the frame axis, the precession axis and the impulse axis being perpendicular to each other, a hydraulic damping means whereby the gyroscope frame is connected with the body, driving means adapted to create a turning moment in the body about the rocking axis thereof tending to restore said body to equilibrium, and means governed by the deflections of the gyroscope frame for controlling the driving means in dependence upon said deflections relatively to the body.

5. A stabilizing apparatus for rocking bodies, including a working gyroscope comprising a frame pivotally mounted about an axis parallel with the rocking axis of said body, and a gyroscope casing pivotally mounted in said frame about a precession axis, the impulse axis of said gyroscope being mounted in said casing, the frame axis, the precession axis and the impulse axis being perpendicular to each other, a hydraulic damping means whereby the gyroscope frame is connected with the body, means for limiting the maximum damping moment of said hydraulic damping means, driving means adapted to create a turning moment in the body about the rocking axis thereof tending to restore said body to equilibrium, and means governed by the deflections of the gyroscope frame for controlling the driving means in dependence upon said deflection relatively to the body.

6. A stabilizing apparatus for rocking bodies, including a working gyroscope comprising a frame pivotally mounted about an axis parallel with the rocking axis of said body, and a gyroscope casing pivotally mounted in said frame about a precession axis, the impulse axis of said gyroscope being mounted in said casing, the frame axis, the precession axis and the impulse axis being perpendicular to each other, hydraulic damping means whereby the frame axis is inelastically and yieldingly connected with the body, a motor connected with the rocking axis of the body for developing turning movements therein tending to restore said body to equilibrium, and a control member for said motor connected with the hydraulic damping means.

7. A stabilizing apparatus for rocking bodies, including a gyroscope comprising a frame pivotally mounted about an axis parallel with the rocking axis of said body, and a gyroscope casing pivotally mounted in said frame about a precession axis, the impulse axis of said gyroscope being mounted in said casing, the frame axis, the precession axis and the impulse axis being perpendicular to each other, and the frame axis being inelastically and yieldingly connected with the body, driving means adapted to create a turning moment in the body about the rocking axis thereof, means for controlling the driving means in dependence upon the deflection of the gyroscope frame relatively to the body, a motor in driving connection with the gyroscope frame and adapted to restore said gyroscope frame to its central position relatively to said body, and means connected with the precession axis of said gyroscope for controlling said motor.

8. A stabilizing apparatus for rocking bodies, including a gyroscope comprising a frame pivotally mounted about an axis parallel with the rocking axis of said body, and a gyroscope casing pivotally mounted in said frame about a precession axis, the impulse axis of said gyroscope being mounted in said casing, the frame axis, the precession axis and the impulse axis being perpendicular to each other, and the frame axis being inelastically and yieldingly connected with the body, driving means adapted to create a turning moment in the body about the rocking axis thereof, means for controlling the driving means in dependence upon the deflection of the gyroscope frame relatively to the body, means connected with the precession axis of the gyroscope adapted to create a precession opposing moment, and means for controlling said last previous means.

9. A stabilizing apparatus for rocking bodies, including a gyroscope comprising a frame pivotally mounted about an axis parallel with the rocking axis of said body, and a gyroscope casing pivotally mounted in said frame about a precession axis, the impulse axis of said gyroscope being mounted in said casing, the frame axis, the precession axis and the impulse axis being perpendicular to each other, and the frame axis being inelastically and yieldingly connected with the body, driving means adapted to create a turning moment in the body about the rocking axis thereof, means for controlling the driving means in dependence upon the deflection of the gyroscope frame relatively to the body, a torque generator connected with the precession axis of said gyroscope, a second gyroscope having three degrees of freedom, and having its frame axis parallel to the rocking axis of said body, and means connected with said second gyroscope adapted to control said torque generator.

10. A stabilizing apparatus for rocking bodies, including a gyroscope comprising a frame pivotally mounted about an axis parallel with the rocking axis of said body, and a gyroscope casing pivotally mounted in said frame about a precession axis, the impulse axis of said gyroscope being mounted in said casing, the frame axis, the precession axis and the impulse axis being perpendicular to each other, and the frame axis being inelastically and yieldingly connected with the body, driving means adapted to create a turning moment in the body about the rocking axis thereof, means for controlling the driving means in dependence upon the deflection of the gyroscope frame relatively to the body, a torque generator connected with the precession axis of said gyroscope, a second gyroscope having three degrees of freedom, and having its frame axis parallel to the rocking axis of said body, and control means connected with said second gyroscope and movable relatively to said body for controlling said torque generator.

11. A stabilizing apparatus for rocking bodies, including a gyroscope comprising a frame pivotally mounted about an axis parallel with the rocking axis of said body, and a gyroscope casing pivotally mounted in said frame about a precession axis, the impulse axis of said gyroscope being mounted in said casing, the frame axis, the precession axis and the impulse axis being perpendicular to each other, and the frame axis being inelastically and yieldingly connected with the body by hydraulic damping means, a motor connected with the rocking axis of the body, a control member for said motor connected with the hydraulic damping means, a second motor in driving connection with the gyroscope frame and adapted to restore said gyroscope frame to its central position relatively to said body, a control member for said second motor connected with the precession axis of said gyroscope, a torque generator connected with the precession axis of said gyroscope, a second gyroscope mounted in a frame on said body with its frame axis parallel to the rocking axis of the body and having three degrees of freedom, and control means for the torque generator of the first gyroscope connected with the frame axis of said second gyroscope and movable relatively to said body.

JOHANN MARIA BOYKOW.